(12) United States Patent
Ramesh et al.

(10) Patent No.: US 8,331,272 B2
(45) Date of Patent: Dec. 11, 2012

(54) AGGREGATION OF RESOURCES OVER MULTIPLE FRAMES IN A TDD COMMUNICATION SYSTEM

(75) Inventors: Rajaram Ramesh, Raleigh, NC (US); Havish Koorapaty, Cary, NC (US); Kumar Balachandran, Cary, NC (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 409 days.

(21) Appl. No.: 12/430,605

(22) Filed: Apr. 27, 2009

(65) Prior Publication Data

US 2009/0274071 A1    Nov. 5, 2009

Related U.S. Application Data

(60) Provisional application No. 61/048,833, filed on Apr. 29, 2008.

(51) Int. Cl.
*H04B 7/00* (2006.01)
*H04W 4/00* (2009.01)
*H04J 3/00* (2006.01)

(52) U.S. Cl. .......................... 370/310; 370/341; 370/345

(58) Field of Classification Search .................. 455/450, 455/451, 452.1, 458, 464, 509, 522, 574, 455/FOR. 244; 370/321, 348, 329, 468, 370/310, 311, 318, 328, 338, 341, 345
See application file for complete search history.

(56) References Cited

U.S. PATENT DOCUMENTS

| 7,672,259 B2 * | 3/2010 | Jang et al. ..................... 370/311 |
| 2007/0086419 A1 | 4/2007 | Jang et al. |
| 2007/0293231 A1 * | 12/2007 | So ................................ 455/450 |

FOREIGN PATENT DOCUMENTS

| EP | 1876768 A | 1/2008 |
| WO | WO 2007/059196 A | 5/2007 |

OTHER PUBLICATIONS

S. Shawn Tsai, et al. "802.16m Frame Structure: Uplink Subframe Aggregation" IEEE 802.16 Broadband Wireless Access Working Group, Jan. 16, 2008, pp. 1-10.

Yongjoo Tcha, et al. "Enhanced MAP Message IEs to Provide a Virtual Multi-Frame Structure for a Periodic Fixed Bandwidth Assignment Scheme" IEEE 802.16 Broadband Wireless Access Working Group, Nov. 16, 2004, pp. 1-18.

* cited by examiner

*Primary Examiner* — Andrew Lai
*Assistant Examiner* — Adam Duda

(57) ABSTRACT

According to embodiments of the present invention, multiple frames or sub-frames on an uplink channel may be aggregated into one logical unit for demodulation and decoding to allow one data packet to span over multiple frames. Multi-frame aggregation is enabled by modifying the uplink resource allocation messages transmitted to the user terminals. The multi-frame resource allocation message includes a BEGIN FLAG field indicating whether a corresponding frame is the first frame in a multi-frame allocation and a REMAINING RESOURCES field to indicate the number of units (e.g., slots or frames) remaining in the multi-frame allocation.

18 Claims, 10 Drawing Sheets

AGGREGATION OF RESOURCES OVER MULTIPLE FRAMES IN A TDD COMMUNICATION SYSTEM

RELATED APPLICATION

This application claims priority to Provisional U.S. Patent Application 61/048,833 filed 29 Apr. 2008, which is incorporated herein by reference.

BACKGROUND

The present invention relates generally to scheduling of user terminals on an uplink shared channel in a mobile communication system and, more particularly, to a method of multi-frame allocation to enable the aggregation of symbol energies over multiple frames for greater efficiency.

The WiMax standard supports both time division duplex (TDD) and frequency division duplex (FDD) operation. In the case of TDD, the uplink and downlink transmissions occur at different times and usually share the same frequency. Time is divided into a sequence of consecutive frames. Each frame has a fixed duration and contains one downlink sub-frame and one uplink sub-frame. The frame is divided into an integer number of OFDM symbols. The number of symbols allocated to the downlink sub-frame and uplink sub-frame is variable.

The medium access control (MAC) protocol for WiMax currently requires that a single MAC protocol data unit (PDU) must be transmitted in one frame. This requirement may result in some inefficiencies. Because user terminals are power limited, it is generally desirable to reduce the number of sub-channels allocated to a single user terminal when the user terminal is operating near the cell edge. Reducing the number of sub-channels enables the user terminal to allocate more power to each sub-channel, thereby increasing the information bit signal-to-noise ratio. The increase in the information bit signal-to-noise ratio due to reduction of sub-channels (greater sub-channelization) is referred to as sub-channelization gain. However, the reduction in the number of sub-channels limits the available bandwidth for the user terminal. The bandwidth limitation may prevent the user terminal from using the most robust modulation and coding scheme. Further, the bandwidth limitation may increase overhead on both the uplink and downlink. When the size of an uplink burst is limited because of sub-channelization, the size of the MAC PDU payload is reduced and the overhead ratio, i.e., the ratio of overhead bits to total bits, is increased. Thus, the effective data rate on the uplink is reduced.

SUMMARY

According to embodiments of the present invention, multiple frames or sub-frames on an uplink channel may be aggregated into one logical unit for demodulation and decoding to allow one data packet to span over multiple frames. Frame aggregation avoids packet-size limitations due to sub-channelization, enables the base station to select the most robust modulation and coding, extend cell range by allowing symbol energies over multiple frames, increase cell range for user terminals, and maintain a desired UL-to-DL ratio.

Multi-frame aggregation is enabled by modifying the uplink resource allocation messages transmitted to the user terminals. The multi-frame resource allocation message includes a BEGIN FLAG field indicating whether a corresponding frame is the first frame in a multi-frame allocation and a REMAINING RESOURCES field to indicate the number of units (e.g., slots or frames) remaining in the multi-frame allocation. The multi-frame resource allocation message enables a single data packet to be transmitted in multiple frames

DETAILED DESCRIPTION

Figure 1:
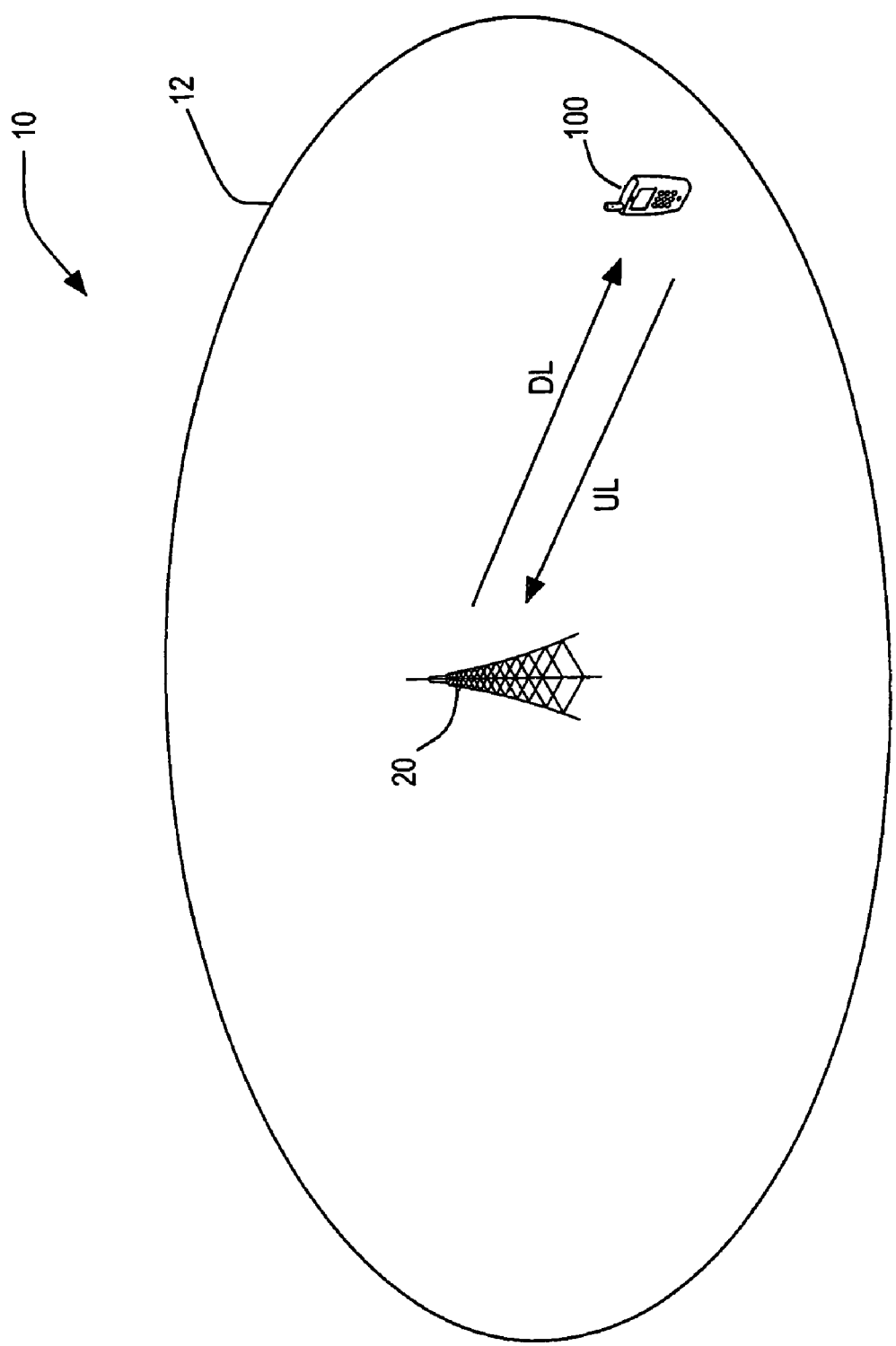
FIG. 1 illustrates an exemplary mobile communication system.

Referring now to the drawings, FIG. 1 illustrates a user terminal 100 in a mobile communication network 10. The user terminal 100 may comprise, for example, a cellular telephone, personal digital assistant, smart phone, laptop computer, handheld computer, or other device with wireless communication capabilities. User terminal 100 communicates with a base station 20 in a serving cell or sector 12 of the mobile communication network 10. The user terminal 100 receives signals on one or more downlink (DL) channels and transmits signals to the base station 20 on one or more uplink (UL) channels.

For illustrative purposes, an exemplary embodiment of the present invention will be described in the context of a WiMax (IEEE 802.16) system. Those skilled in the art will appreciate, however, that the present invention is more generally applicable to other wireless communication systems, including Wideband Code-Division Multiple Access (WCDMA) and Long-Term Evolution (LTE) systems.

WiMax systems employ orthogonal frequency division multiplexing (OFDM). WiMax systems divide the available bandwidth into a plurality of frequency subcarriers. The subcarriers can be organized into sub-channels for allocation to individual users. The subcarriers comprising a single sub-channel may be contiguous, or may be spread over the available bandwidth.

Figure 2:
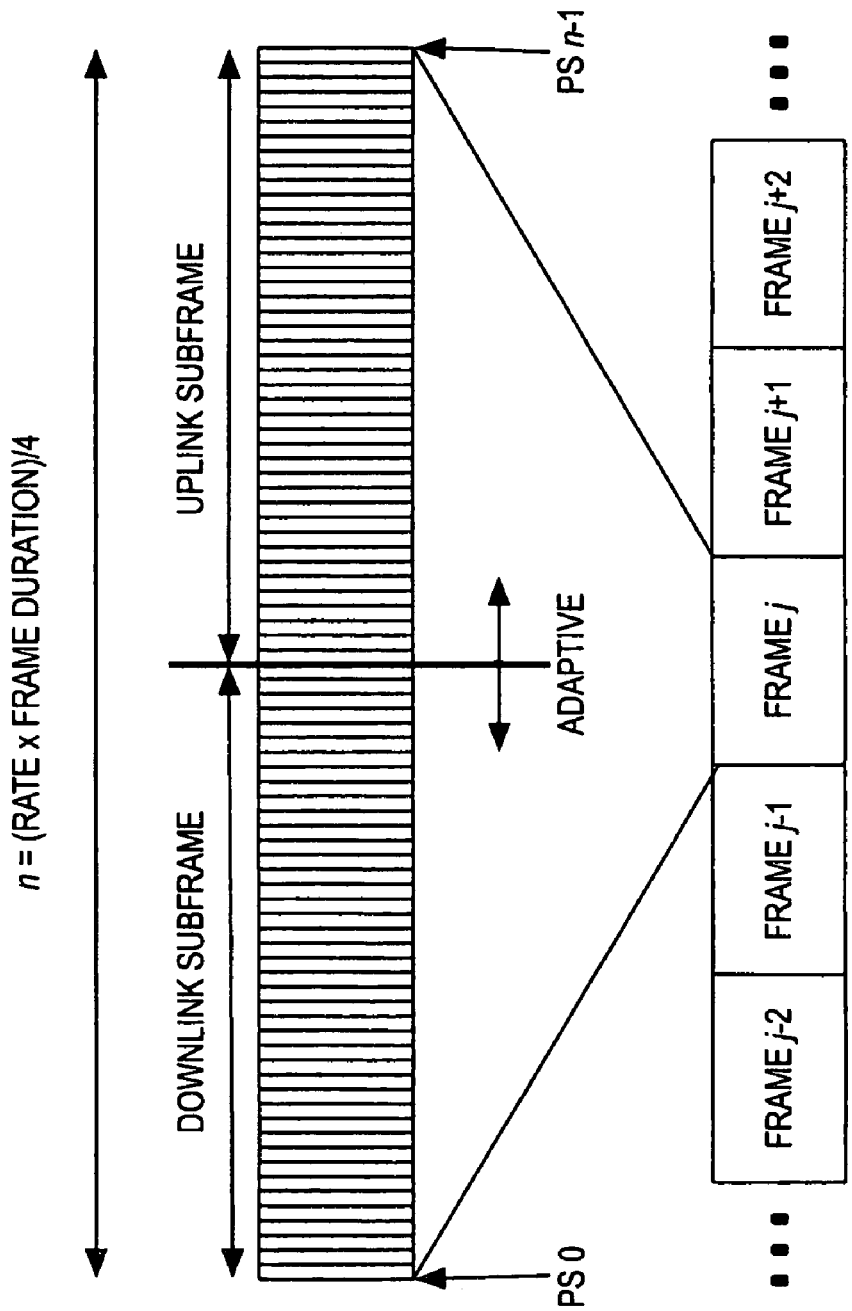
FIG. 2 illustrates the framing for a WiMax system.

The WiMax standard supports both time division duplex (TDD) and frequency division duplex (FDD) operation. In the case of TDD, the uplink and downlink transmissions occur on the same frequency or carrier and are multiplexed in time. In a WiMAX system, for example, time is divided into a sequence of consecutive frames as illustrated in FIG. 2. Each frame has a fixed duration and contains one downlink sub-frame and one uplink sub-frame. The frame is divided into an integer number of OFDM symbols. The number of symbols allocated to the downlink sub-frame and uplink sub-frame is variable. The split between the uplink and downlink is a system parameter and is controlled at higher layers within the system.

Figure 3:
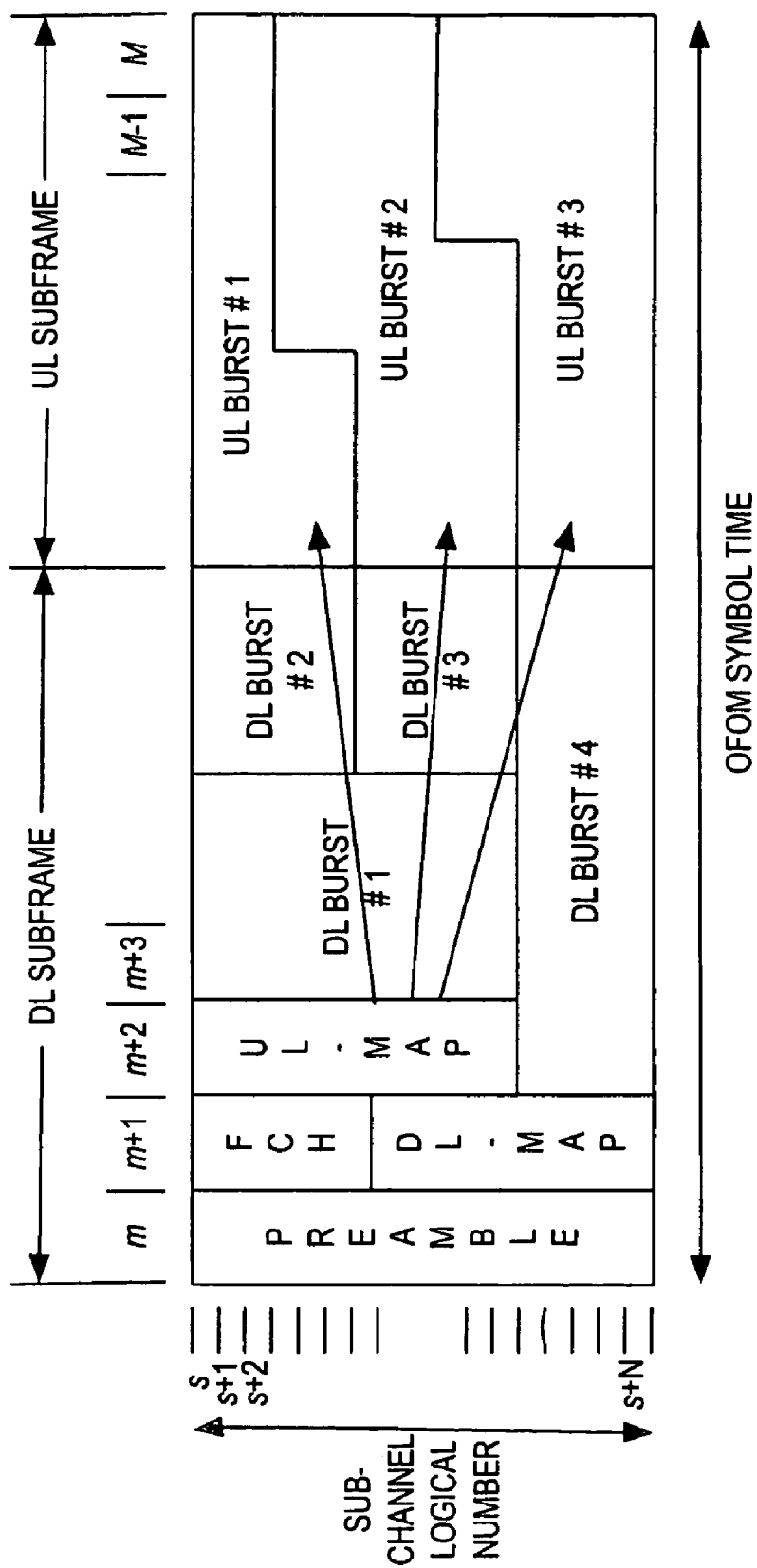
FIG. 3 illustrates the frame structure for a single frame in a WiMax system.

FIG. 3 illustrates a single TDD frame in a WiMax system. As shown in FIG. 3, the first symbol of the downlink sub-frame includes a preamble, which is used for synchronization. A frame control header (FCH) and resource allocations for the downlink and uplink, designated respectively as the DL-MAP and UL-MAP, follow the preamble. The FCH provides information about the frame configuration, such as the usable sub-channels, coding scheme, and MAP message length. The DL-MAP and UL-MAP indicate the allocation of downlink and uplink resources in the downlink sub-frame and uplink sub-frame, respectively. The DL-MAP comprises a series of resource allocation messages to the user terminals 100 receiving an allocation of downlink slots. Similarly, the UL-MAP comprises a series of uplink resource messages to user terminals receiving allocations of uplink slots. FIG. 3 shows allocations of the downlink slots to four different user terminals and the allocation of uplink slots to three different user terminals.

The medium access control (MAC) protocol for WiMax currently requires that a single MAC protocol data unit (PDU) must be transmitted in one frame. This requirement may result in some inefficiencies. Because user terminals 100 are power limited, it is generally desirable to reduce the number of sub-channels allocated to a single user terminal 100 when the user terminal 100 is operating near the cell edge. Power for a transmission gets divided among the assigned subchannels in frequency. Reducing the number of subchannels, while proportionally increasing the duration of transmission, enables increase in the amount of energy per bit of transmission, thereby increasing the signal-to-noise ratio. However, the reduction in the number of sub-channels limits the available bandwidth for the user terminal 100. The bandwidth limitation may prevent the user terminal 100 from using the most robust modulation and coding scheme, without fragmentation of the data packet into smaller MAC PDUs. When the size of an uplink burst is limited because of sub-channelization, the size of the MAC PDU payload is reduced and the overhead ratio, i.e., the ratio of overhead bits to total bits, is increased. Thus, the effective data rate on the uplink is reduced.

According to embodiments of the present invention, multiple UL sub-frames may be aggregated into one logical unit for demodulation and decoding to allow one MAC PDU to span over multiple frames. Consequently, greater symbol energies can be accumulated to provide increased coverage and larger payload for better efficiency. Uplink sub-frame aggregation is enabled by modifying the uplink resource allocation messages transmitted in the UL-MAP message.

Figure 4:
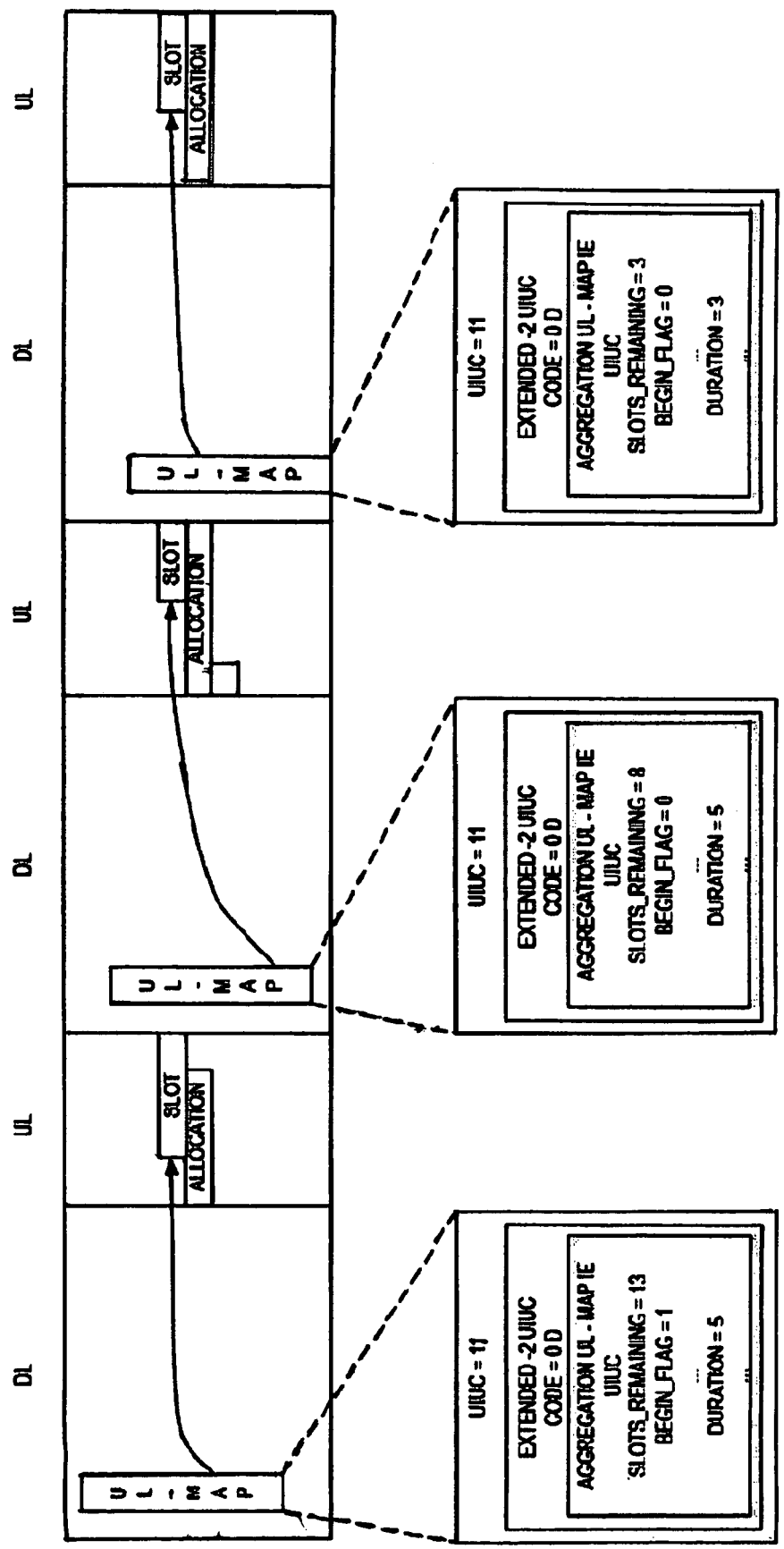
FIG. 4 illustrates a multi-frame allocation for a single MAC PDU in a WiMax system

FIG. 4 illustrates the aggregation of three uplink subframes into a single logical unit for demodulation and decoding. In the example shown in FIG. 4, uplink slots are allocated to a user terminal 100 in three separate frames. While the aggregated uplink sub-frames are shown in FIG. 3 as being in three consecutive frames, it is not required that the uplink slots be allocated in consecutive frames. That is, the present invention allows the allocation of uplink slots in non-consecutive frames. In the example, a total of 13 slots are allocated with 5 slots in the first frame, 5 slots in the middle frame, and 3 slots in the last frame. The allocated slots from all three frames are combined and processed as a single MAC PDU at the receiver. At the MAC level, data is divided into a number of chunks equal to the number of allocated slots and mapped in order to the allocated slots.

FIG. 4 also illustrates an exemplary signaling protocol that may be used to enable uplink sub-frame aggregation. As previously noted, each frame containing data for the user terminal 100 includes a UL-MAP message indicating the uplink resource allocations for a subsequent frame. The UL-MAP message contains UL-MAP information elements (IEs) which may embed resource allocation messages or IEs with multiple formats. One such format is the extended-2 UIUC IE, which is referred to herein as the extended 2 format. The extended 2 format is used when UIUC field in a UL-MAP IE is et to 11. The UL-MAP message with the extended 2 format may encapsulate one or more uplink resource allocation messages referred to in the standard as UL-MAP information elements (IEs). As previously noted, the current standard requires that a single MAC PDU must be transmitted within a single frame. In the present invention, a modified version of the UL-MAP IE is used to indicate a multi-frame allocation. The modified UL-MAP IE is referred to herein as an Aggregated UL-MAP IE or, more generically, as a multi-frame resource allocation message. The use of the Aggregated UL-MAP IE can be indicated by defining a new type code (e.g., UIUC=0D for an Aggregated UL-MAP IE).

The Aggregated UL-MAP IE contains a DURATION field that indicates the number of uplink slots allocated in a corresponding frame. In addition, the Aggregated UL-MAP IE contains two fields not present in a conventional UL-MAP IE. Specifically, the Aggregated UL-MAP IE contains a BEGIN FLAG field and a REMAINING RESOURCES field. The BEGIN FLAG field contains a flag indicating whether the current frame in a multi-frame allocation is the first frame of the multi-frame allocation. The REMAINING RESOURCES field contains an integer value indicating the number of remaining resources in a multi-frame allocation. In some embodiments, the REMAINING RESOURCES field may comprise a REMAINING SLOTS filed indicating the number of remaining slots in a multi-frame allocation. In other embodiments, the REMAINING RESOURCES field may comprise a REMAINING FRAMES field indicating the number of remaining frames in a multi-frame allocation.

In some embodiments of the invention, the Aggregated UL-MAP IE may also include a TRANSMISSION TOGGLE field to make the protocol more robust. As explained in more detail below, the TRANSMISSION TOGGLE field contains a flag that is toggled for every new multi-frame allocation. Those skilled in the art will appreciate that an Aggregated UL-MAP IE may include additional elements as required by the standard. These other elements are well known in the art and are not material to uplink sub-frame aggregation. Therefore, such non-material details are omitted for the sake of brevity. Information about additional fields required for the UL-MAP IE are described in the IEEE 802-16-2004 standard.

In the first frame of a multi-frame allocation, the begin flag is set to 1 to indicate that the current frame is the first frame of a multi-frame allocation and the REMAINING RESOURCES field is set to indicate the total number of slots or frames in the multi-frame allocation. In subsequent frames of the multi-frame allocation, the begin flag is set to 0 and the value of the REMAINING RESOURCES field is decremented by the number of slots previously allocated to the user terminal 100 in all previous frames of the multi-frame allocation. The DURATION field in each Aggregated UL-MAP IE indicates the number of slots allocated in the corresponding frame.

In the examples shown in FIG. 4, the user terminal 100 is allocated 13 slots over three frames: 5 slots in the first two frames and 3 slots in the last frame. Thus, the REMAINING RESOURCES field equals 13 in the first frame, 8 in the second, and 3 in the last frame. As noted previously, the REMAINING RESOURCES field could, alternatively, indicate the number of remaining frames in the multi-frame allocation.

The BEGIN FLAG field and REMAINING RESOURCES field enables multi-frame allocation and allows the base station 20 to allocate uplink slots in non-consecutive frames. The user terminal 100 only transmits in frames where it has received an allocation. In each frame where uplink slots are allocated, the user terminal 100 transmits a corresponding portion of the MAC PDU. In the examples given above where thirteen slots are allocated over three frames, the MAC PDU is segmented into three segments and each segment is mapped to the slots in a corresponding frame.

The UL-MAP message transmitted by the base station 20 may contain both Aggregated UL-MAP IEs and conventional UL-MAP IEs as defined in the WiMax standard. The Aggregated UL-MAP IEs are used to make multi-frame allocations as described above. Conventional UL-MAP IEs are used to allocate slots in a single frame. In WiMax, the allocations are cumulative and begin with the lowest numbered sub-channel on the first non-allocated OFDM symbol defined by the allocation start time field of the UL-MAP message. Each UL-MAP IE (both aggregated and conventional) indicates the number of slots allocated. Each UL-MAP IE after the first allocates slots immediately following the previous allocation. The slots are allocated in a time-first manner. If the end of the uplink sub-frame is reached, the allocation shall continue at the first OFDM symbol as defined by the allocation start time field in the next sub-channel.

In order to determine what resources have been allocated, a user terminal 100 needs to parse the preceding UL-MAP IEs to determine the number of slots previously allocated to determine the beginning point in its own allocation. Because pre-existing or legacy user terminals will not be able to interpret the Aggregated UL-MAP IE used for multi-frame allocations, the conventional UL-MAP IEs may be placed in front of the Aggregated UL-MAP IEs in the UL-MAP message. That is, locating the Aggregated UL-MAP IEs at the end of the UL-MAP message will allow the legacy mobile terminals to parse the conventional UL-MAP IEs and determine their respective allocations before any multi-frame allocations are made. Alternatively, any conventional UL-MAP IEs preceded by an Aggregated UL-MAP IE may include an offset field that is set to skip over any preceding multi-frame allocations.

In one exemplary embodiment of the invention, base station 20 may indicate the number of remaining frames in the Aggregated UL-MAP IE, rather than the number of remaining slots as shown in FIG. 4. In this embodiment, the base station 20 sets the begin flag in the first frame of the multi-frame allocation to 1, and sets the REMAINING RESOURCES field equal to the total number of frames in the multi-frame allocation. In succeeding frames, which do not have to be consecutive, the base station 20 sets the begin flag to 0, and decrements the number of frames remaining. The number of slots allocated in each frame is indicated by the DURATION field. As in the previous embodiment, the user terminal 100 only transmits in frames where it receives an allocation.

In another exemplary embodiment, base station 20 may be constrained to allocate an equal number of slots in every frame. In this embodiment, the base station 20 sets the begin flag to 1 in the first frame and to 0 in each succeeding frame of the multi-frame allocation. The REMAINING RESOURCES field in the first frame indicates the total number of frames in the multi-frame allocation. The size of the allocation equals the total number of frames times the number of slots allocated in each frame. In succeeding frames, the begin flag is set to 0 and the REMAINING RESOURCES field is decremented. Because the number of slots allocated is indicated in the first frame, it is not necessary to include a DURATION field in the succeeding frames. Thus, the size of the UL-MAP message is reduced.

Figure 5:
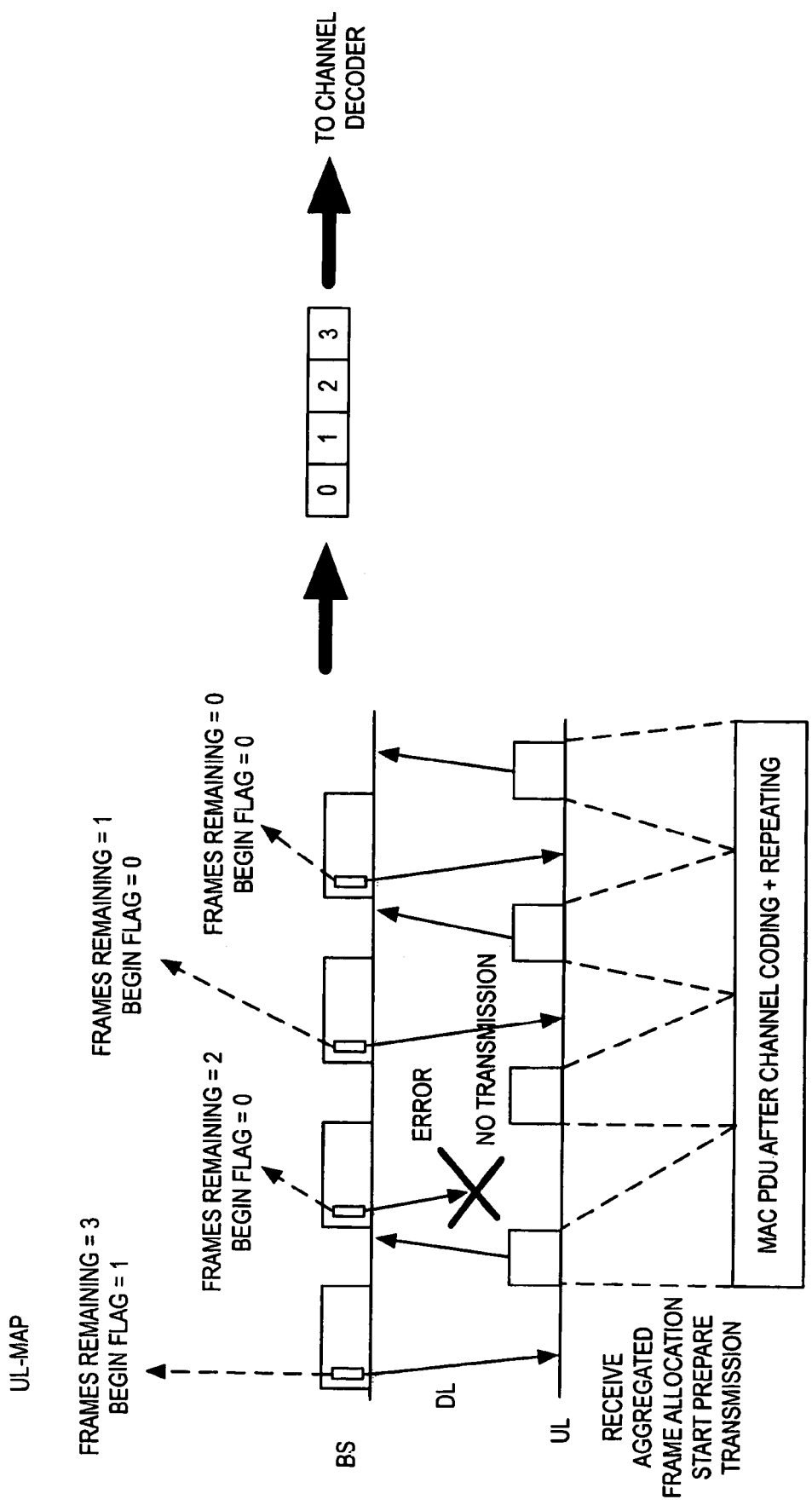
FIG. 5 illustrates a scenario where a multi-frame allocation message is not decoded by the user terminal.

Due to the nature of the wireless communication channel, it can be expected that the user terminal 100 will occasionally miss a resource allocation message (e.g., UL-MAP IE) transmitted by the base station 20. The MAC protocol as described herein improves robustness and enables decoding even when a resource allocation message is missed. FIG. 5 illustrates an exemplary scenario where a resource allocation message in a multi-frame allocation is missed by the user terminal 100. In this example, the multi-frame allocation spans four frames. For convenience, the frames are numbered from 0-3. The user terminal 100 successfully decodes the Aggregated UL-MAP IE for the first frame of the multi-frame allocation. The BEGIN FLAG field is set to 1 and the remaining frames field is set to 3. In this example, the total number of frames allocated may be determined by adding 1 to the remaining frames indicated by the first frame of the multi-frame allocation. The user terminal 100 fails to decode the Aggregated UL-MAP IE transmitted for the second frame of the multi-frame allocation, but receives the Aggregated UL-MAP IE for the third and fourth frames. The remaining frames field in the Aggregated UL-MAP IE for the third frame is set to 1. Thus, when the user terminal 100 decodes the Aggregated UL-MAP IE for the third frame, it can determine based on the value of the REMAINING RESOURCES field that the Aggregated UL-MAP IE for the second frame was missed. In this case, user terminal 100 may discard the portion of the MAC PDU that was mapped to the slots in the second frame of the multi-frame allocation. Thus, base station 20 receives the portions of the MAC PDU corresponding to frames 0, 2, and 3. The receiver at the base station 20 declares erasure of the bits corresponding to the slots in frame 1 and proceeds to decode the MAC PDU. Because the entire transmission is channel coded and interleaved, the missing bits are spread over the entire code word, allowing the base station 20 to potentially decode the MAC PDU depending on the signal to impairment ratio for the transmission.

Figure 6:
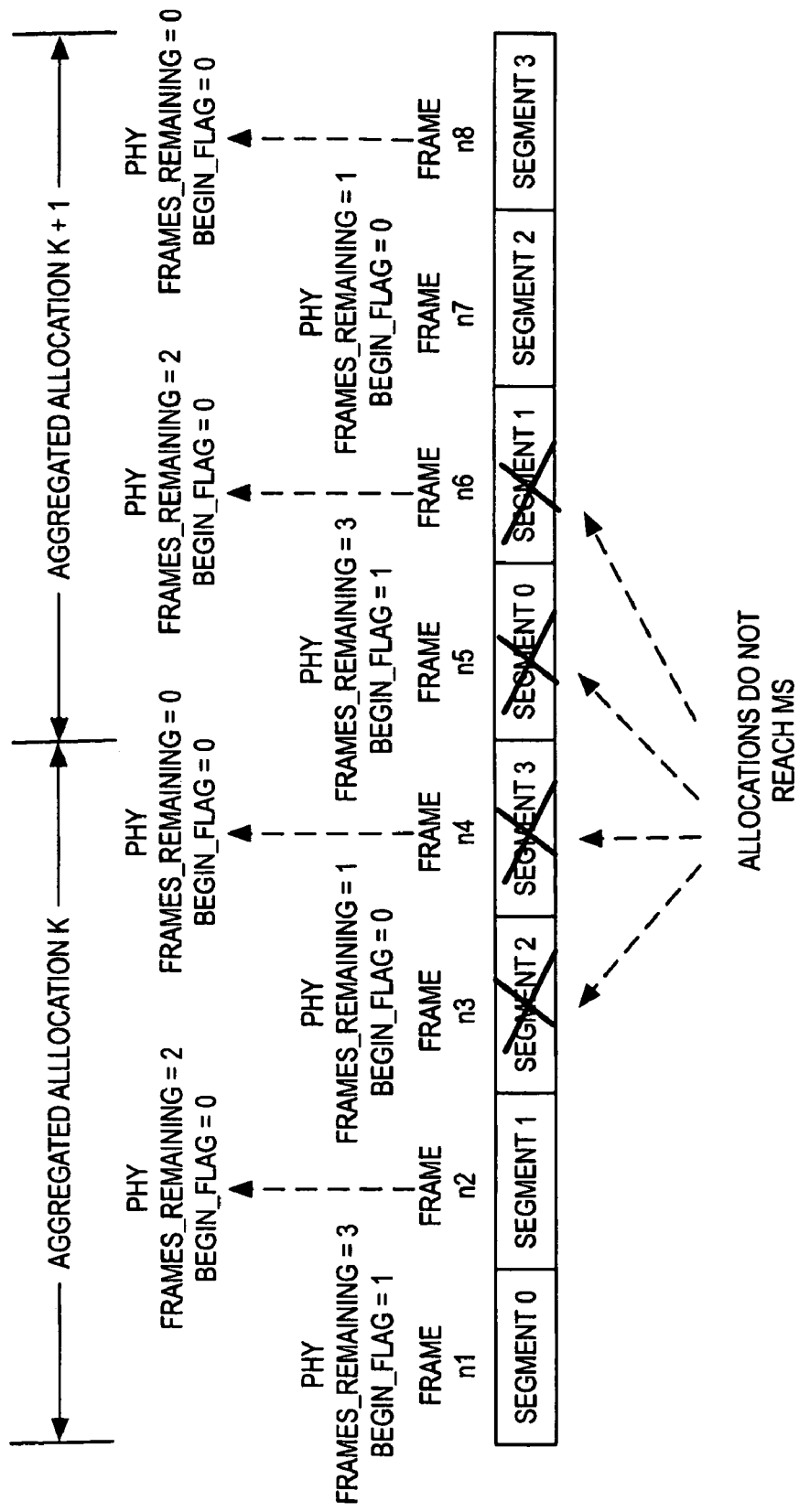
FIG. 6 illustrates a scenario where multiple multi-frame allocation messages bridging two different multi-frame allocations are missed by the user terminal.

FIG. 6 illustrates another scenario wherein user terminal 100 misses some resource allocation messages in two consecutive multi-frame allocations. In this example, base station 20 makes two consecutive multi-frame allocations to a user terminal 100. Each multi-frame allocation spans four frames. For convenience, the frames in each allocation are numbered 0-3. The user terminal 100 receives the Aggregated UL-MAP IE for frames 0 and 1 in first multi-frame allocation, and for frames 2 and 3 in the second multi-frame allocation. The Aggregated UL-MAP IE for the frame 2 and 3 of the first multi-frame allocation and frames 0 and 1 of the second multi-frame allocation are missed. In this case, user terminal 100 could mistakenly conclude that the Aggregated UL-MAP IE for frame 2 in the second allocation is part of the previous multi-frame allocation.

The problem described above can be avoided by including a TRANSMISSION TOGGLE field in the Aggregated UL-MAP IE. The TRANSMISSION TOGGLE field comprises a binary flag that is toggled after each multi-frame allocation. In the example shown in FIG. 6, the TRANSMISSION TOGGLE field would be set to "0" or "1" during the first multi-frame allocation and to "1" or "0" during the second multi-frame allocation. Thus, user terminal 100 would recognize that frame 2 in the second multi-frame allocation is not a continuation of the previous multi-frame allocation.

Figure 7:
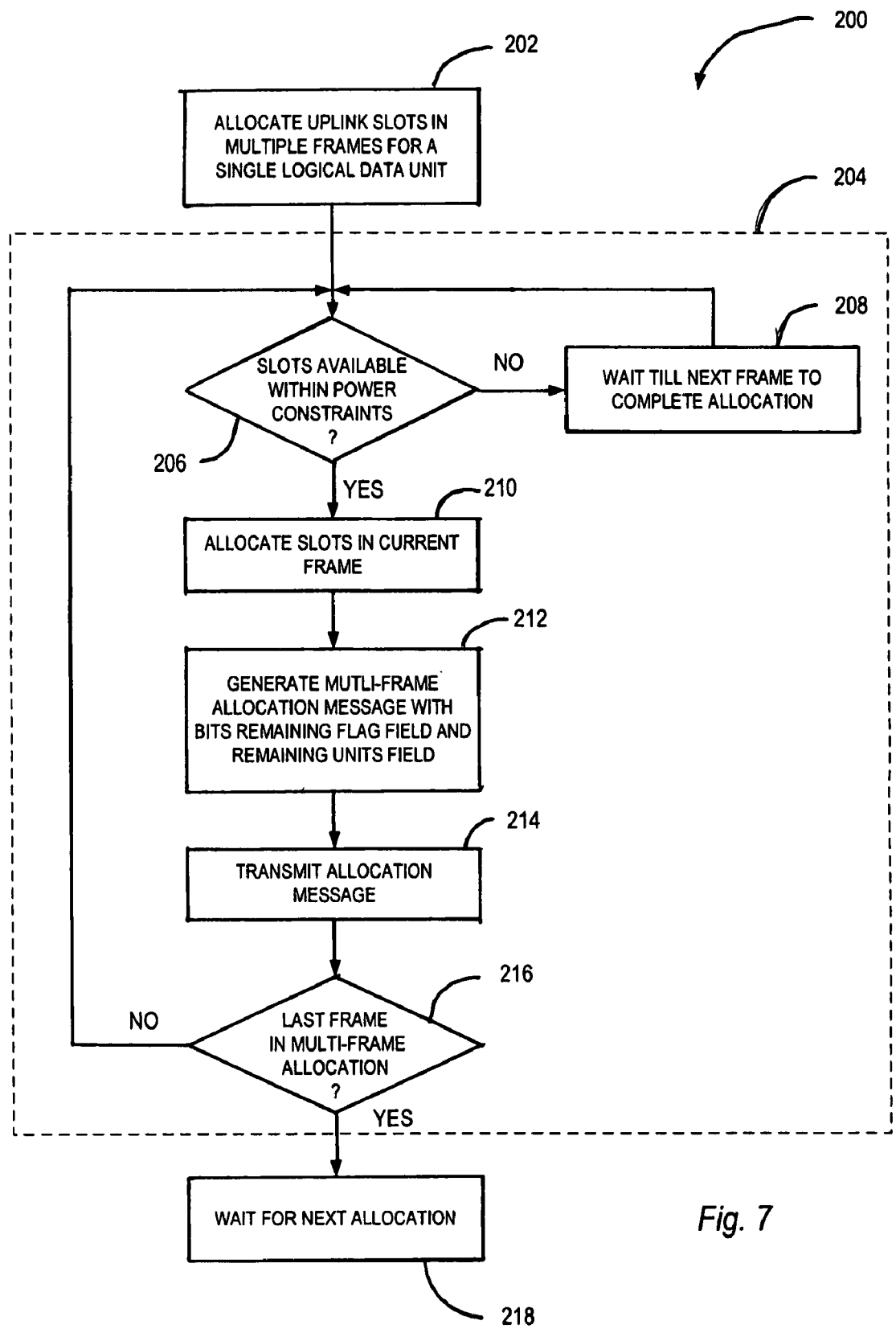
FIG. 7 illustrates an exemplary multi-frame allocation procedure implemented by a base station.

FIG. 7 illustrates an exemplary procedure 200 implemented by a base station 20 for scheduling transmissions from a user terminal 100 to the base station 20 on an uplink channel. Base station 20 allocates uplink slots in multiple frames for a single MAC PDU (block 202). After the allocation is made, the base station 20 generates and sends a multi-frame allocation message to the user terminal 100 for each frame of the multi-frame allocation (block 204). It is not necessary that the frames allocated be consecutive. The multi-frame allocation message for each frame includes a BEGIN FLAG field and a REMAINING RESOURCES field. As previously noted, the BEGIN FLAG field is set to 1 in the first frame of the multi-frame allocation and is set to 0 in each succeeding frame. The REMAINING RESOURCES field is set to indicate the total number of units allocated (either slots or frames) and is decremented in each subsequent frame of the multi-frame allocation. The multi-frame allocation messages may also include a DURATION field indicating the number of slots allocated in each frame of the multi-frame allocation and a TRANSMISSION TOGGLE field as previously described.

When a multi-frame allocation is made, the scheduler at base station 20 first determines the total number of slots in the multi-frame allocation, the coding and modulation scheme, and the number of frames in the multi-frame allocation. Thereafter, allocations are made on a frame-by-frame basis. In each frame, the scheduler determines whether slots are available in the current frame within the power constraints of the user terminal 100 (block 206). If not, the scheduler waits for the next frame (block 208). If slots are available within the power constraints of the user terminal 100, the scheduler allocates slots in the current frame (block 210), generates a multi-frame allocation message with a BEGIN FLAG field and REMAINING RESOURCES field (block 212), and transmits the resource allocation message to the user terminal 100 (block 214). The scheduler then determines whether the last frame in the multi-frame allocation is reached (block 216). If not, the process repeats until the last frame is reached, after which the scheduler waits for the next multi-frame allocation (block 218).

Figure 8:
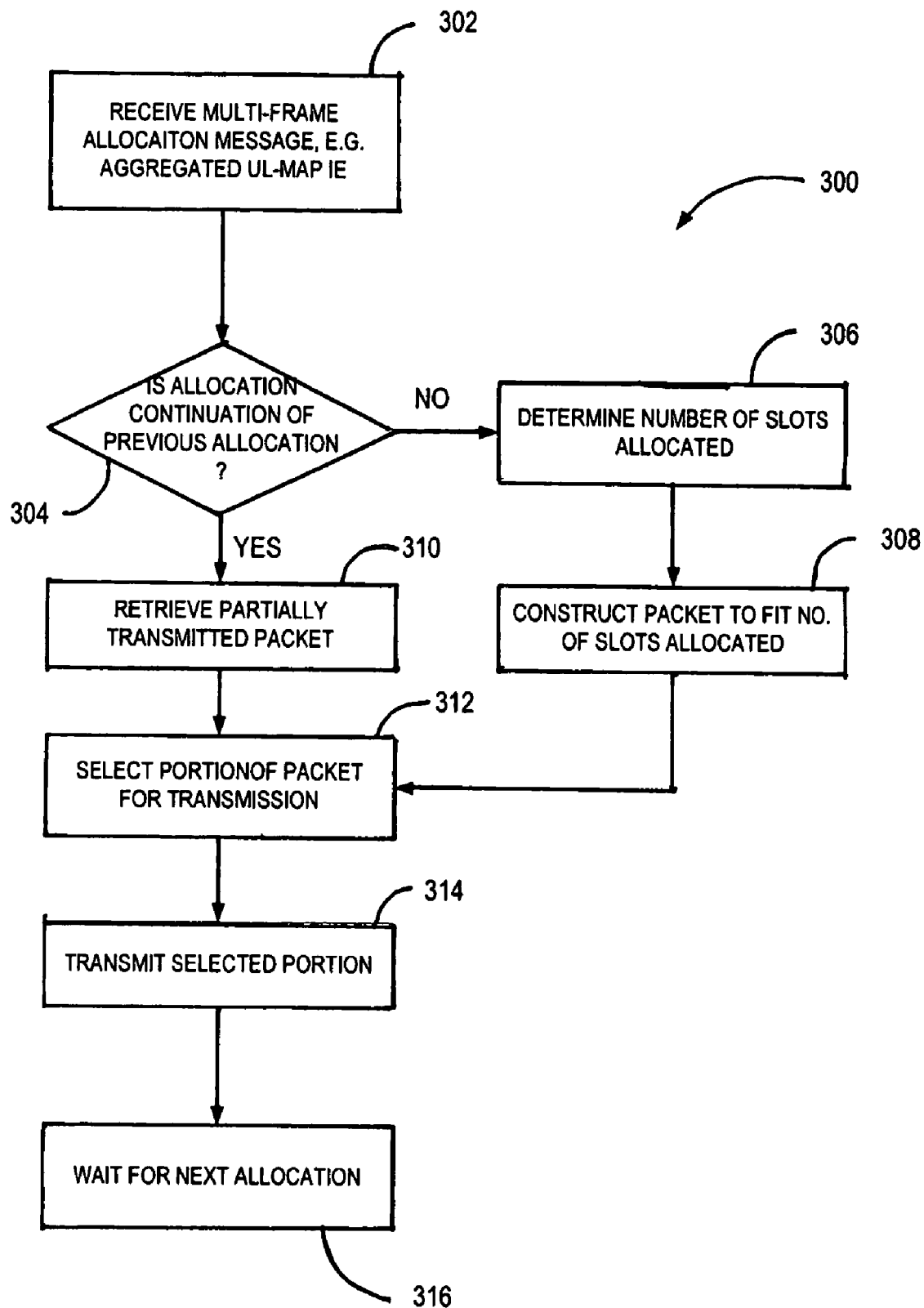
FIG. 8 illustrates exemplary transmission procedure implemented by a user terminal during a multi-frame allocation.

FIG. 8 illustrates an exemplary procedure 300 implemented by a user terminal 100 in response to receipt of a multi-frame allocation message. The procedure begins when user terminal 100 receives the multi-frame allocation message (block 302). The user terminal 100 determines whether the multi-frame allocation message is a new multi-frame allocation or a continuation of a previous multi-frame allocation (block 304). In the case of a new multi-frame allocation, the user terminal 100 determines the number of slots allocated based on the REMAINING RESOURCES field (block 306) and constructs a MAC PDU to fit the number of allocated slots (block 308). If the multi-frame allocation message is a continuation of a previous multi-frame allocation, the user terminal 100 retrieves the untransmitted portion of the MAC PDU from a memory (block 310). In both cases, the user terminal 100 selects a portion of the MAC PDU corresponding to the current frame (block 312) and transmits the selected portion to the base station 20 (block 314). The user terminal 100 then waits for the next frame of the multi-frame allocation (block 316).

Figure 9:
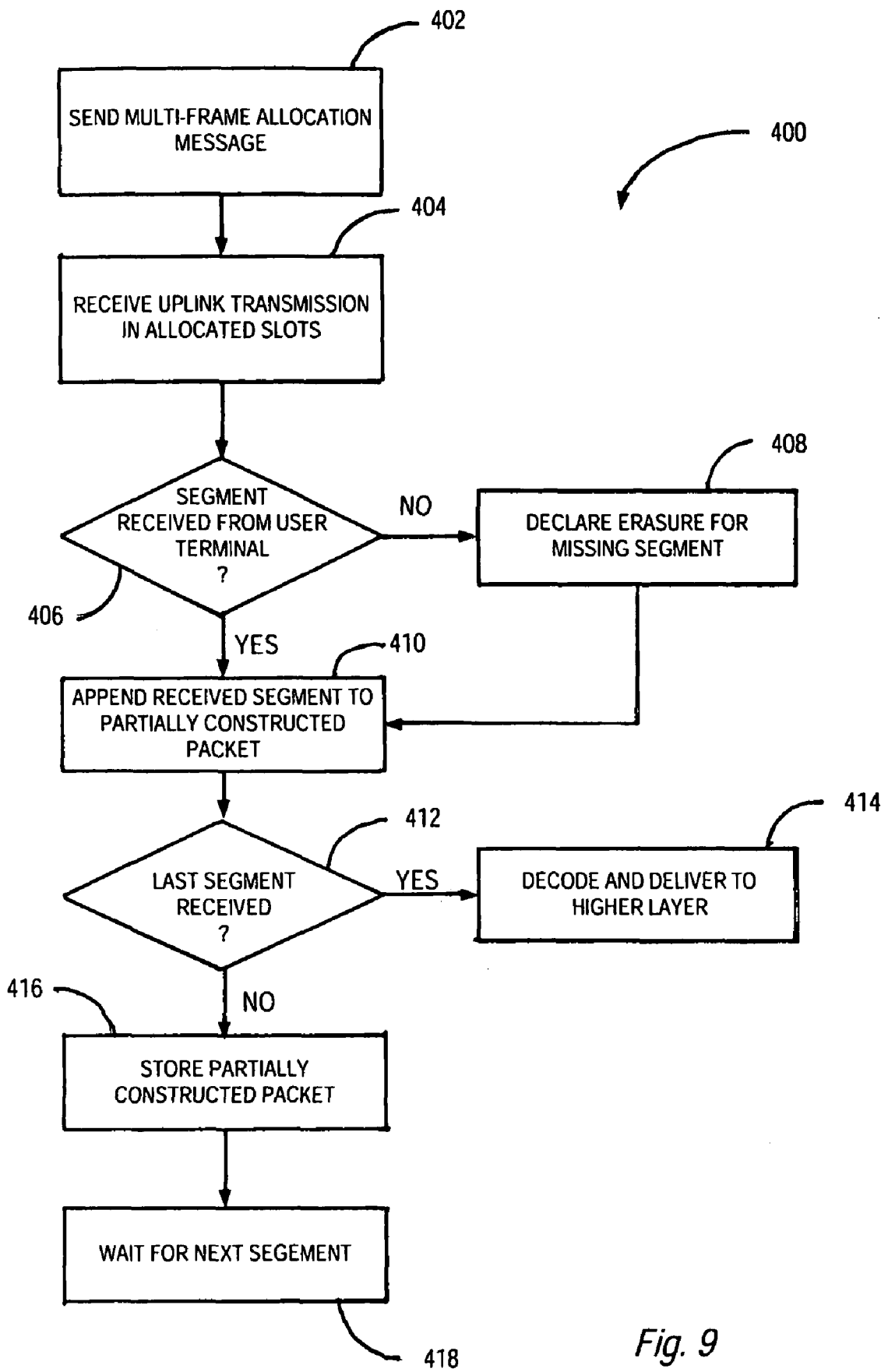
FIG. 9 illustrates exemplary reception procedure implemented by a base station during a multi-frame allocation

FIG. 9 illustrates an exemplary procedure 400 implemented by the base station 20 to aggregate data transmitted over multiple frames. The procedure 400 begins when the base station 20 sends a multi-frame allocation message to the user terminal 100 (block 402). Base station 20 receives the uplink transmission in the slots allocated to the user terminal 100 (block 404) and processes the received signal to determine whether a segment of the MAC PDU has been transmitted by the user terminal 100 (block 406). If no MAC PDU segment is transmitted by the user terminal 100, the base station 20 declares an erasure for the missing segment that should have been transmitted (block 408) and appends the erasure to the previously received segments, if any (block 410). If a segment of the MAC PDU is received, the segment is appended to the previously-received data, if any, for the MAC PDU (block 410). Base station 20 then determines whether the last segment of the MAC PDU has been received (block 412). If so, the base station 20 decodes and delivers the received MAC PDU to higher protocol layers (block 414). If not, base station 20 stores the partially-received MAC PDU (block 416) and waits for the next segment of the MAC PDU (block 418).

Figure 10:
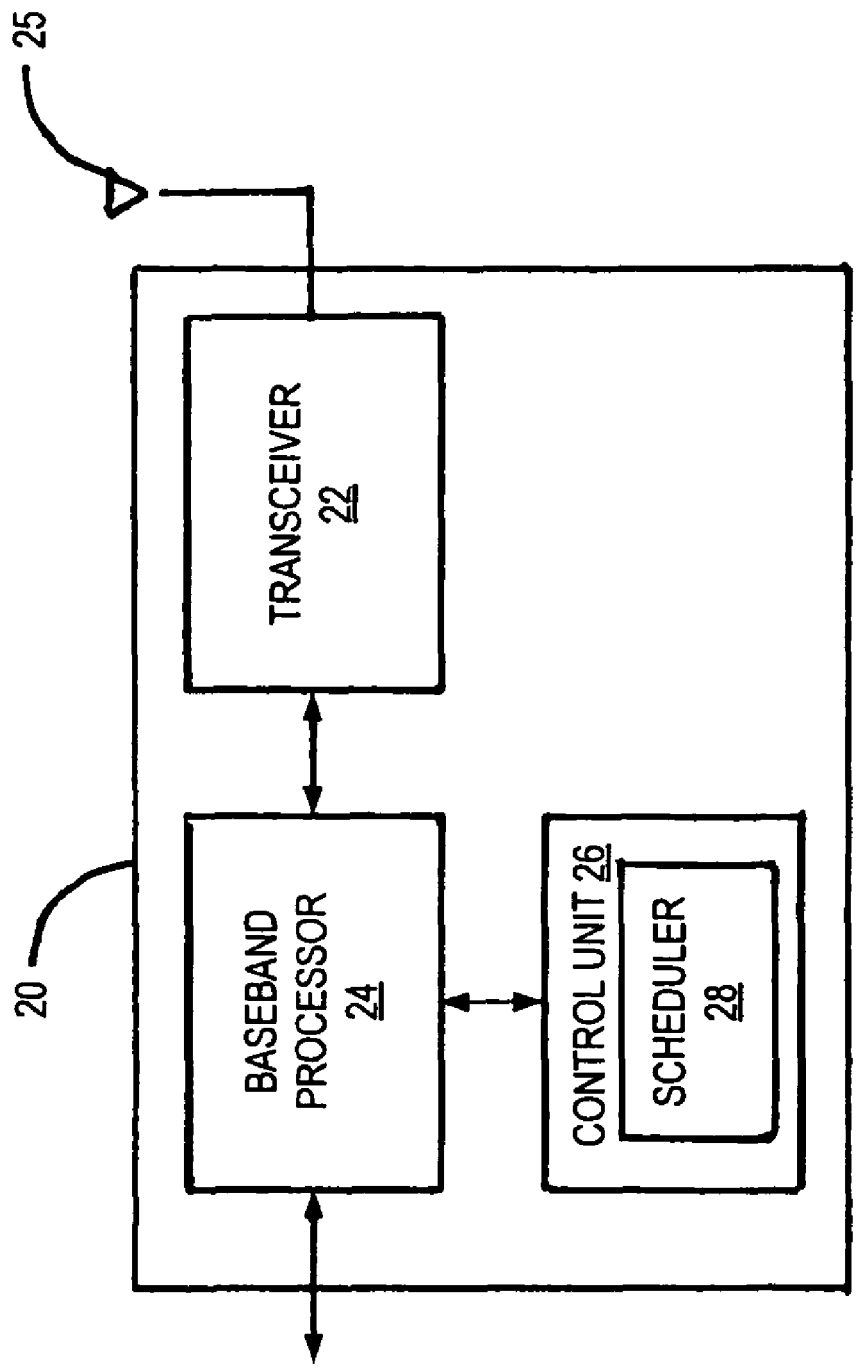
FIG. 10 illustrates an exemplary base station capable of multi-frame allocation.

FIG. 10 illustrates an exemplary base station 20 according to one exemplary embodiment of the present invention. Base station 20 comprises a transceiver 22 coupled to an antenna 25, baseband processor 24, and control unit 26. Transceiver 22 comprises a standard cellular transceiver operating according to any known standard. In the exemplary embodiment, the transceiver 22 comprises a WiMax transceiver. Baseband processor 24 comprises one or more processors, microcontrollers, hardware circuits, or a combination thereof, for processing signals transmitted and received by the base station 20. For example, the baseband processor 24 may demodulate and decode signals received from a user terminal in the allocated uplink slots. The baseband processor 24 may declare an erasure if no data is received in one of said allocated uplink slots; and decode the data packet without the erased data. Control unit 26, which may comprise one or more processors, controls the overall operation of the base station 20. The control unit 26 includes a scheduler 28, which operates within the MAC protocol layer. The scheduler 28 schedules the user terminals 100 on the uplink and allocates resources to the user terminals 100 as previously described.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of scheduling transmissions by multi-frame allocation from a user terminal to a base station on an uplink channel, said method comprising:
   spreading uplink transmission of a single data packet over a plurality of frames, wherein each frame comprises of uplink resource slots for uplink transmission;
   allocating uplink slots in each frame by a scheduler to the user terminal for transmission of a part of said single data packet from the user terminal to the base station; and
   indicating each allocated uplink slot of said part of the single data package to be transmitted as a multi-frame allocation message, said multi-frame allocation message comprising:
   a BEGIN FLAG field containing a begin flag to indicate whether the current frame is a beginning frame in the multi-frame allocation; and
   a REMAINING RESOURCES field containing a number that indicates remaining resources in the multi-frame allocation.

2. The method of claim 1 wherein the multi-frame allocation message further includes a DURATION field containing a number of slots in the current frame allocated to the user terminal.

3. The method of claim 1 wherein the multi-frame allocation message further includes a TRANSMISSION TOGGLE field containing a toggle flag that changes value in each successive multi-frame allocation.

4. The method of claim 1 wherein the REMAINING RESOURCES field contains a number that indicates remaining frames in the multi-frame allocation.

5. The method of claim 1 wherein the REMAINING RESOURCES field contains a number that indicates remaining slots in the multi-frame allocation.

6. The method of claim 1 further comprising sending one or more single-frame allocation messages in the same frame as the multi-frame allocation message prior to the transmission of said multi-frame allocation message.

7. The method of claim 1 further comprising sending one or more single-frame allocation messages in the same frame as the multi-frame allocation message following the transmission of said multi-frame allocation message, wherein said single frame allocation message includes an offset to indicate a starting pointing of said allocation.

8. The method of claim 1 wherein the number of allocated slots in each frame of the multi-frame allocation is equal.

9. The method of claim 1 further comprising:
demodulating segments of said data packet received in said allocated uplink slots;
declaring an erasure if a segment is not received in one of said allocated uplink slots;
decoding said data packet without said missing segment if an erasure occurs.

10. A base station for scheduling transmissions by multi-frame allocation from a user terminal to said base station on an uplink channel, said base station comprising:
a receiver to receive transmissions from the user terminal on an uplink channel; and
a scheduler for scheduling said transmissions from said user terminal to said base station on said uplink channel, said scheduler configured to:
spread uplink transmission of a single data packet over a plurality of frames, wherein each frame comprises of uplink resource slots for uplink transmission;
allocate uplink slots in each frame to a user terminal for transmission of a part of said single data packet from the user terminal to the base station; and
indicate each allocated uplink slot of said part of the single data package to be transmitted as a multi-frame allocation message, said multi-frame allocation message comprising a BEGIN FLAG field containing a begin flag to indicate whether the current frame is a beginning frame in the multi-frame allocation and a REMAINING RESOURCES field containing a number that indicates remaining resources in the multi-frame allocation.

11. The base station of claim 10 wherein the multi-frame allocation message further includes a DURATION field containing a number of slots in the current frame allocated to the user terminal.

12. The base station of claim 10 wherein the multi-frame allocation message further includes a TRANSMISSION TOGGLE field containing a toggle flag that changes value in each successive multi-frame allocation.

13. The base station of claim 10 wherein the REMAINING RESOURCES field contains a number that indicates remaining frames in the multi-frame allocation.

14. The base station of claim 10 wherein the REMAINING RESOURCES field contains a number that indicates remaining slots in the multi-frame allocation.

15. The base station of claim 10 wherein the scheduler is further configured to send one or more single-frame allocation messages in the same frame as the multi-frame allocation message prior to the transmission of said multi-frame allocation message.

16. The base station of claim 10 wherein the scheduler is further configured to send one or more single-frame allocation messages in the same frame as the multi-frame allocation message following the transmission of said multi-frame allocation message, wherein said single frame allocation message includes an offset to indicate a starting pointing of said allocation.

17. The base station of claim 10 wherein the number of allocated slots in each frame of the multi-frame allocation is equal.

18. The base station of claim 10 further comprising a baseband processor configured to demodulate segments of said data packets received in one or more of said allocated uplink slots; declare an erasure if a segment is not received in one of said allocated uplink slots; and decode said data packet without said missing segment if an erasure occurs.

* * * * *

UNITED STATES PATENT AND TRADEMARK OFFICE
CERTIFICATE OF CORRECTION

PATENT NO. : 8,331,272 B2
APPLICATION NO. : 12/430605
DATED : December 11, 2012
INVENTOR(S) : Ramesh et al.

It is certified that error appears in the above-identified patent and that said Letters Patent is hereby corrected as shown below:

In Fig. 8, Sheet 8 of 10, for Tag "312", in Line 1, delete "PORTIONOF" and insert -- PORTION OF --, therefor.

In Column 2, Line 3, delete "frames" and insert -- frames. --, therefor.

In Column 2, Line 13, delete "system" and insert -- system. --, therefor.

In Column 2, Line 24, delete "allocation" and insert -- allocation. --, therefor.

Signed and Sealed this
Nineteenth Day of March, 2013

Teresa Stanek Rea
*Acting Director of the United States Patent and Trademark Office*